United States Patent [19]

Hammer et al.

[11] 4,396,978

[45] Aug. 2, 1983

[54] MULTIPROCESSOR SYSTEM WITH SWITCHABLE ADDRESS SPACE

[75] Inventors: Dieter Hammer; Peter Michel; Titus Schwanda, all of Vienna, Austria

[73] Assignee: U.S. Philips Corporation, New York, N.Y.

[21] Appl. No.: 120,957

[22] Filed: Feb. 13, 1980

[30] Foreign Application Priority Data

Feb. 19, 1979 [AT] Austria ............................... 1270/79

[51] Int. Cl.³ .............................................. G06F 15/16
[52] U.S. Cl. ..................................... 364/200; 364/900
[58] Field of Search ... 364/200 MS File, 900 MS File

[56] References Cited

U.S. PATENT DOCUMENTS 4,181,936 1/1980 Kober ................................. 364/200
4,219,873 8/1980 Kober et al. ....................... 364/200

*Primary Examiner*—Gareth D. Shaw
*Assistant Examiner*—Terence Flyntz
*Attorney, Agent, or Firm*—James J. Cannon, Jr.

[57] ABSTRACT

In a data processing system comprising at least two microcomputers, one microcomputer (1) serves as a master to control the or each other microcomputer (2, 3 respectively) as a slave. In order to improve that utilization of the system the bus (4) of the master serves as a common bus and each slave has associated with it a buffer memory (5, 6 respectively) for the intermediate storage and transmission of data. The buffer memory can be connected, by means of an associated switching device (7, 8 respectively), alternately to the bus (9, 10, respectively) of the slave and to the common bus thereby switching the address field constituted by the buffer memory into the address space of the slave and into the address space of the master respectively. Furthermore, each slave has associated with it two interconnected input/output interfaces (11, 12 and 13, 14 respectively which serve for transmission of status signals concerning the master of the relevant slave. One of said interfaces is connected to the common bus, while the other interface is connected to the bus of the relevant slave. Each switching device is controlled by the corresponding input/output interface connected to the common bus, and hence by the master.

2 Claims, 4 Drawing Figures

MULTIPROCESSOR SYSTEM WITH SWITCHABLE ADDRESS SPACE

BACKGROUND OF THE INVENTION

The invention provides a data processing system comprising at least two computers which are coupled to a common bus, one said computer being a master which controls at least one further computer as a slave. Provision of such a configuration enables the individual computers to operate fully simultaneously and asynchronously, independently of each other, without mutual synchronization being required during the transmission of data, such mutual synchronization being required, for example, in a known (see below) data processing system including a common bus for a plurality of microcomputers. As a result, the utilization of the system can be improved. Furthermore, in such a system it can be arranged that each microcomputer can have available substantially the whole of its address space, as opposed to another known (see below) data processing system having a common memory for a plurality of microcomputers. Availability of the complete address space exists in a conventional data processing system comprising a common bus for a plurality of microcomputers, but comparatively complex input/output interfaces between the common bus and the individual microcomputers are required therein. Moreover, provision of such a configuration enables a high transmission rate to be achieved when a plurality of simultaneous data transmissions occur; thus this speed can be roughly comparable with that of a data processing system having a common memory for a plurality of microcomputers. Thus, provision of such a configuration enables the advantages of a data processing system including a common bus for a plurality of microcomputers and the advantages of a system having a common memory for a plurality of microcomputers to be combined Data processing systems of the said two known kinds are described, for example, in the article "Four design principles get the most out of microprocessor systems," Electronics, Jan. 20, 1977, pages 102 to 110, notably with reference to FIGS. 8 and 9 of this article.

If the system includes a plurality of slaves, it can be an advantage if the address space of the master is capable of accommodating the address spaces of all buffer memories. Transmission of data between two slaves can then be particularly simple, because the master can then have available in its address space the buffer memories of both slaves involved in the data transmission, so that the data transmission can take place from one buffer memory to the other without intermediate storage.

It can also be an advantage if the transmission of data from and/or to said buffer memory via the common bus takes place via a direct memory access unit which gains access to the common bus. Provision of such a unit can enable the transmission speed of the data to be increased.

Status signals transmitted via the input/output interfaces may control the master or the relevant slave by interrupting a program sequence presently being carried out therein. If this is so delay times can be reduced and the load on the relevant computer can be reduced.

BRIEF DESCRIPTION OF THE DRAWINGS

Embodiments of the invention will be described in detail hereinafter, by way of example, with reference to the accompanying diagrammatic drawings, in which

In FIG. 1 a data processing system includes (micro) computers 1, 2 and 3 respectively, it being assumed that the microcomputer 1 is a master which controls the microcomputers 2 and 3 which operate as slaves. These microcomputers are referred to hereinafter as master and slaves for the sake of simplicity. Also for the sake of simplicity FIG. 1 shows only two slaves; however, more than two slaves may in fact be present. As a further alternative the system may include only a single slave. The bus 4 of the master 1 serves as a common bus. Each slave 2, 3 has associated with it a buffer memory, 5, 6 respectively; each buffer memory can be alternately connected, by means of an associated switching device, 7, 8, respectively, to the bus 9 or 10 of the relevant slave 2 or 3, and to the common bus 4. Furthermore, in order to allow status signals concerning the master and the slaves to be transmitted, each of the slaves 2 and 3 has associated with it two interconnected input/output interfaces, 11, 12 and 13, 14 respectively. The input-/output interfaces 11 and 13 are connected to the busses 9 and 10, respectively, of the relevant slave, and the input/output interfaces 12 and 14 are connected to the common bus 4. Each of the latter two input/output interfaces 12 and 14 also serves for controlling the switching device associated with the buffer memory associated with the relevant slave. The input/output interface 12 thus controls the switching device 7, this being denoted by the line 15, and the input/output interface 14 controls the switching device 8 as denoted by the line 16. Thus the relevant buffer memory can be connected either to the bus of the slave or to the common bus as denoted symbolically by the switches 17, 18 and 19, 20. The connections between the input/output interfaces 11, 12 and between the interfaces 13, 14 are realized via a number of leads which are denoted by groups of arrows 21, 22 in FIG. 1, the direction of each arrow indicating whether the relevant lead or connection serves for transmitting a status signal from the slave to the master or from the master to the slave. Most of these status signals serve to signal whether data are available for transmission or whether data can be received, but some signal whether the microcomputers or peripheral apparatuses controlled thereby are operating in an incorrect manner, in which case the necessary corrective steps can be taken.

Figure 1:
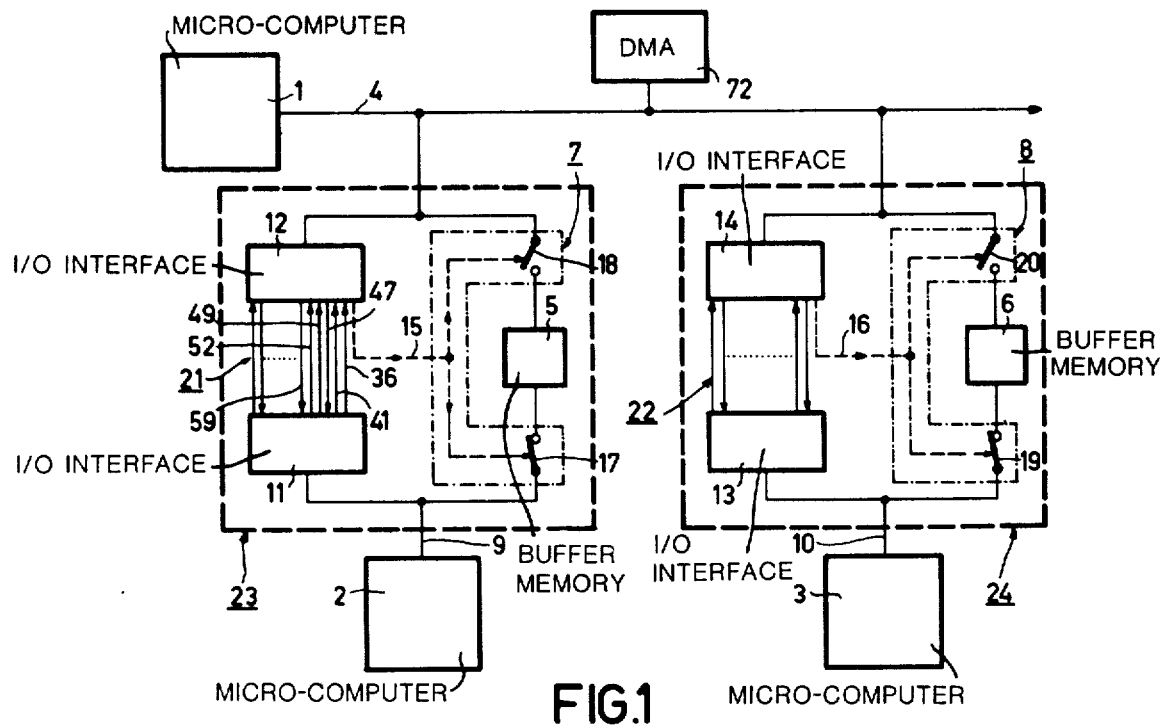
FIG. 1 shows a block diagram of a first embodiment.
Figure 2:
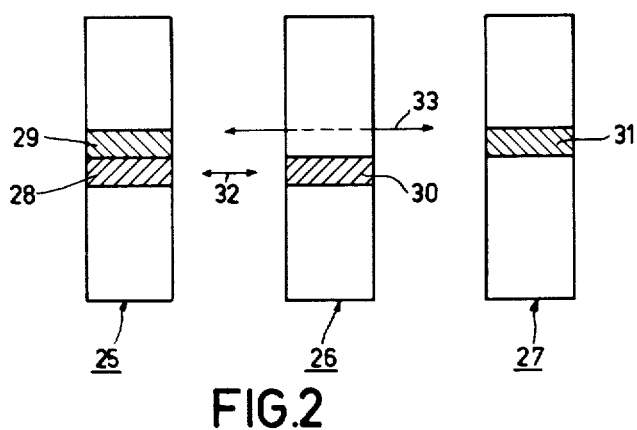
FIG. 2 shows the relationship between various stores included in the embodiment of FIG. 1.

The buffer memory 5, the switching device 7 and the input/output interfaces 11, 12 associated with the slave 2 and shown as a block 23 in FIG. 1, and the buffer memory 6, the switching device 8 and the input/output interfaces 13, 14 associated with the slave 3 and shown as a block 24, each constitute a coupling or transmission unit for the transmission of status signals and data between the relevant slaves 2, 3 and the master 1. The address field constituted by each buffer memory can be switched, by means of the associated switching device, into the address space of the relevant slave or into the address space of the master as alternatives. The address space of the master is preferably capable of accommodating fields constituted by all the buffer memories at the same time, to simplify the transmission of data between the slaves. This is shown diagrammatically in FIG. 2, the block 25 denoting the memory address space of the master, while the block 26 denotes the memory address space of the slave 2 and the block 27 denotes the memory address space of the slave 3. The memory address space 25 of the master includes a section 28 and a further section 29, these corresponding to the address fields represented by the buffer memories 5 and 6 respectively, associated with the slaves 2 and 3 respectively. The memory address space of the slave 2 includes a section 30 which corresponds to the address field represented by the buffer memory 5 and the memory address space of the slave 3 comprises a section 31 which corresponds to the address field represented by the buffer memory 6. The sections 28 and 30 and 29 and 31 correspond to each other. The double arrows 32 and 33 indicate that the address field represented by a buffer memory can be situated in the memory address space of the master or in the memory address space of the slave with which the buffer memory is associated, as alternatives (depending on the state of the corresponding switching device). During the transmission of data between the slaves 2 and 3, the address fields represented by both buffer memories 5 and 6 can thus be taken up in the memory address space of the master and the data can then be directly transferred from one buffer memory to the other, so that intermediate storage of the data can be dispensed with.

Data transmission, be it between the master and a slave or between two slaves, is always controlled by the master, the necessary synchronization between the master and the slave being realized via the relevant input/output interfaces, the or each relevant buffer memory being connected either in the address space of the relevant slave or in that of the master. For each data transmission operation a parameter block is despatched via the relevant buffer memory which then contains all data required for realizing the operation, such as the sender address, the receiver address, the length of the data block, the operation to be executed, etc. Status signals transmitted via the corresponding input/output interfaces indicate, as already mentioned, the availability of new data to be transmitted, be it from the master to the slave or vice versa, and the ability of the relevant slave to store new data, transmission of the data being possible in an asynchronous manner. This is sometimes referred to as "handshake".

Now reference will be made to an illustrative example of an arrangement according to FIG. 1 built up with commercial available integrated circuits. The microcomputers 1, 2 and 3 can be type Z80, 6800 etc. microcomputers, the input/output interfaces 11, 12, 13, 14 can be type Z80 PIQ or 6800 PIA. The bus 4 will be constituted by the bus of a master Z80 (6800 etc.), which consists of an address and a data bus. The same holds for the bus 9 (and 10) constituted by the bus of a slave Z80. (6800 etc).

The master-address bus presents its addresses through gating logic (for example gates type DM 81 LS 97), these are reference numbers 18 and 20 of FIG. 1., to the buffer memory 5 and 6 respectively. On the other hand the slave-address buses present their addresses through gating logic (of the same type as referred to above), these are reference numbers 17 and 19 of FIG. 1 to the buffer memory 5 and 6 respectively. As to data, the data buses are connected to the buffer memories-inputs/outputs through bus-drivers (for example of the type 3216). Controlled by line 15 and 16 respectively the busdrivers will be activated either to read/write data from bus 4 out/into buffer 5 or 6 respectively, or to read/write data from bus 9 or 10 out/into buffer 5 or 6.

From the above it should be clear that the switching of the buffer memories means that by the handling of addresses, the address fields of the buffer memories are either part of the address space of the master memory or of the slave memory. As to data, these are physically in the buffer memories and need not to be transferred back and forth to the physical memory places of the master- and/or slave-memories.

Figure 3:
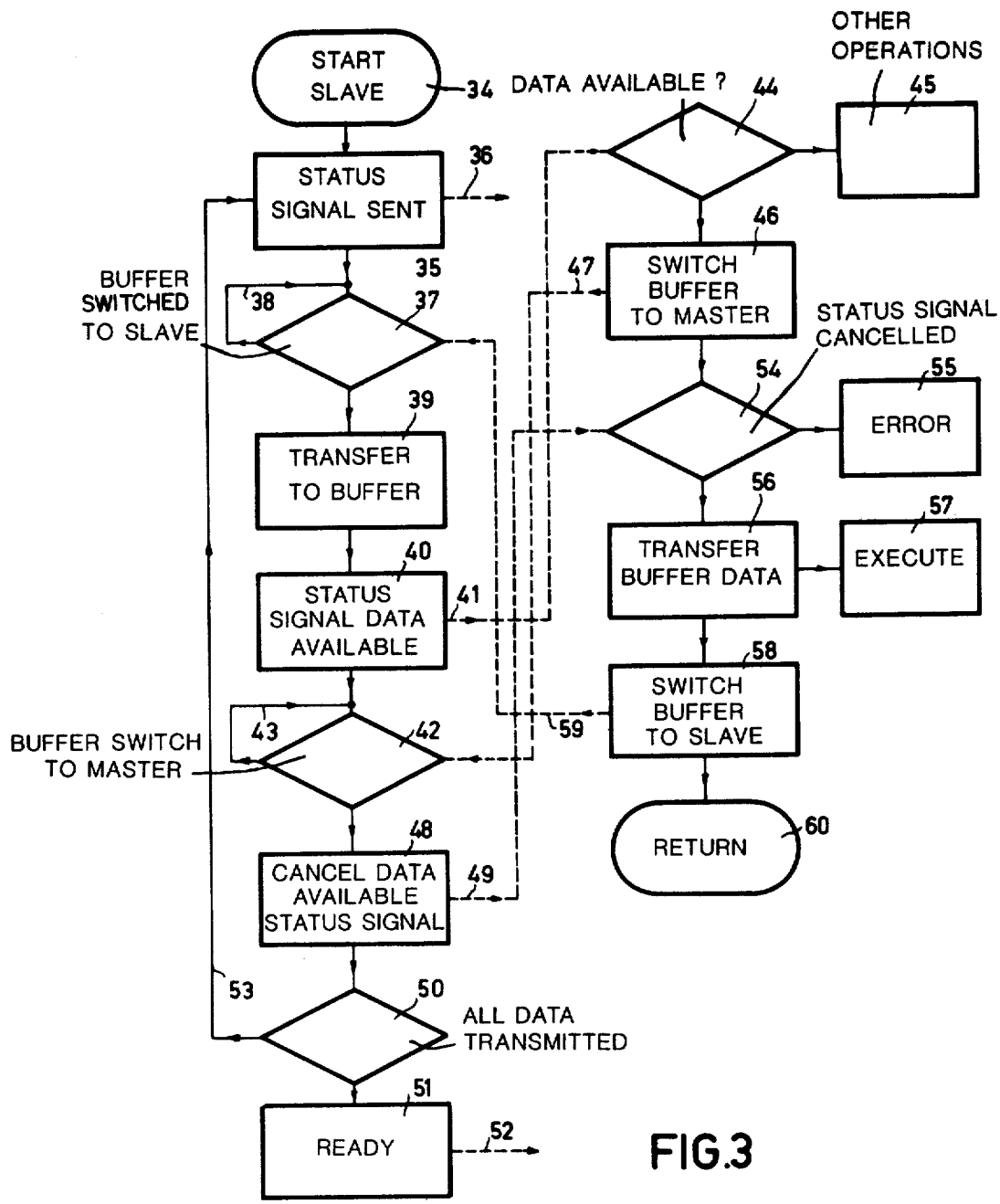
FIG. 3 shows a flow chart illustrating the operation of the embodiment of FIG. 1.

Hereinafter, the operation of the data processing system shown in FIG. 1 will be illustrated on the basis of transmission of data from the slave 2 to the master 1, the simplified flow chart shown in FIG. 3 being relevant to such an operation. The left-hand part of the chart shows the operations in the slave, and its right-hand part shows the operations in the master. In the case under consideration, the slave 2 acts as a sender and the master 1 acts as a receiver of data. Reference numeral 34 denotes the start of the operation in the slave 2, and at 35 the master is supplied with a status signal, via the input/output interface 11, the lead 36 and input/output interface 12 (see FIG. 1), indicating that the sender is not available for taking up data. At 37, the sender checks whether the buffer memory 5 is at present switched into its address space by the switch 17; each buffer memory is always in the address space of the relevant slave when this slave is not participating in a data transmission. If this is not the case, the sender waits, via the loop 38, until the buffer memory 5 is actually in its address space. At 39, the relevant parameter block and the data are transferred to the buffer memory 5. At 40 the master is supplied, via the input/output interface 11, the lead 41 and the input/output interface 12, with a status signal indicating that data are available, after which the sender checks, at 42, whether the master has taken up the buffer memory 5 in its address space by closing the switch 18; if not the sender waits in the loop 43 until this has taken place.

At 44, the master checks whether one of the slaves has data available. If this is not the case, it executes other operations at 45. If on the other hand the status signal indicating that the slave 2 has data available is present on the lead 41, the master activates, at 46, the switching device 7 via the input/output interface 12, (c.f. line 15 in FIG. 1) so that the switch 17 is opened and the switch 18 is closed. Thus, the buffer memory 5 is switched from the address space of the sender to the address space of the master. Subsequently, a status signal indicating that the buffer memory 5 is in the address space of the master is supplied to the sender via the input/output interface 12, the lead 47 and the input/output interface 11. At 48, the sender cancels its status signal that data are available, this being signalled to the master, via the lead 49, as a new status. At 50, the sender checks whether all data have been transmitted. If this is the case, the sender supplies the master, at 51, via the lead 52, with a status signal that it is ready for taking part in further data transfer. If, on the other hand, the data transfer from the sender, has not yet been completed, the status signal (lead 36) that the sender is not yet available for taking up data is applied to the master via the loop 53, after which the slave 2 again presents itself as a sender and waits for the data to be requested.

After the taking over of the buffer memory 5 into the address space of the master, the latter checks, at 54, whether the sender has cancelled, via line 49, the status signal that data are available. If this is not the case, an error signal is given at 55. If it is the case, however, the content of the buffer memory 5 is transferred at 56, to its destination in accordance with the relevant parameter block and the desired operation is executed at 57. After the taking over of the content of the buffer memory 5 by the master, the master actuates the switching device 7 again, at 58, via the input/output interface 11 (line 15 in FIG. 1) so that the switch 18 is opened again and the switch 17 is closed again. The buffer memory 5 is then again present in the address space of the slave 2, this being signalled as a status signal to the slave via lead 59. When this happens the cycle is complete. At 60, the master returns to its previous operation or starts a new operation.

The transfer of data from the master to a slave is carried out in a completely analogous manner, the master then being the sender and the slave being the receiver. In such a case the master first takes up the buffer memory of the relevant slave into its address space, transfers the relevant parameter block and the data into the buffer memory and subsequently switches the latter into the address space of the slave.

The transfer of data between two slaves is also carried out in an analogous manner, the slave 2 for example, then acting as a sender and the slave 3 as a receiver. The sender first checks whether the buffer memory 5 assigned to it is in its address space. If this is the case, it writes into it the data to be transferred and also the associated parameter block and signals this to the master 1 via the input/output interfaces 11, 12, after which the master switches the buffer memory 5, by means of the switching device 7 which is activated via the input/output interface 12, into its own address space and reads the receiver address from the parameter block. Subsequently, the master checks, via the input/output interfaces of the specified receiver, in the present case the input/output interfaces 13, 14 of the slave 3, whether the slave 3 is ready to accept new data. As soon as this is the case, the master switches, via the switching device 8 activated via input/output interface 14, the buffer memory 6 of the slave 3 into its own address space and writes the data from the buffer memory 5 of the sender into the buffer memory 6 of the receiver. Subsequently, the master informs the slave 3, via the input/output interfaces 13, 14, that new data are available and switches, via the switching device 8, the buffer memory 6 into the address space of the slave 3 again, after which the slave 3 reads the parameter block present in its buffer memory and executes the corresponding operations.

In the interests of obtaining a very high transmission speed of the data, it is advantageous to arrange that the data transfer from the buffer memory of the sender to the buffer memory of the receiver takes place in a manner which is known per se using a direct memory access unit, sometimes referred to as a DMA, which, after having been loaded with the relevant data by the master 1, automatically gains access to the common bus 4 and transfers the complete content of the buffer memory of the sender as one block to the buffer memory of the receiver. A direct memory access unit of this kind is denoted by the reference numeral 72 in FIG. 1 and can be formed, for example, by a commercially available integrated circuit having the type number Z 80 DMA. If such a DMA is provided the master will start the transmission of the complete block by inputting the address of the buffer memory of the relevant sender, the address of the buffer memory of the desired receiver, and the length of the block, after which this block will be automatically transmitted between the execution of the various commands of an arbitrary program of the master i.e. in a transparent manner for the master. After the transmission of the block has been completed, the master will be informed.

It has also been found to be advantageous to arrange that the status signals which are transmitted via the input/output interfaces and which, as described, indicate the availability of new data for the slaves or the master or the ability to store new data etc., themselves initiate the relevant operations in the master or the slaves in a known manner by causing interruption signals, also referred to as interrupts, to occur, such signals interrupting the running program sequence after completion of an operation step presently being carried out or at a point in the sequence where (according to the programming technique) an interruption is allowed and the operation indicated by the interrupt signal to be executed instead in accordance with its priority. As a result, the load on the micro-computer can be reduced and the delays occurring can be minimized.

Furthermore, as has already been mentioned, the input/output interfaces can be constructed to also transmit error signals, enabling, jamming of certain kinds to be avoided. Such jamming might otherwise occur, for example, due to the fact that an error which occurs during transmission of data could not otherwise be signalled to the master via the relevant buffer memory, because this buffer memory would then be blocked by data. In a system of the kind described such an error signal can be transmitted via the relevant input/output interfaces, enabling the master to correct the error.

It may happen that a data block to be transmitted exceeds the capacity of the buffer memory. In such a case, the block will have to be transmitted in parts, the associated parameter block being transmitted either only with the first part or with each part. In such a case the master can carry out the plurality of data transmission operations required interspersed with other operations, i.e. in a quasi-simultaneous manner therewith.

In a system of the kind described it is possible to arrange that the master takes over commands for data processing by slaves when appropriate, in addition to its function of controlling the system and the transmission of data, enabling the calculation capacity of the individual microcomputers to be used in an optimum manner by causing data processing instructions which would utilize a microcomputer acting as a slave only poorly, to be taken over by the microcomputer acting as the master, so that its load rate increases. Of course, instructions can also be treated by slaves separately.

Figure 4:
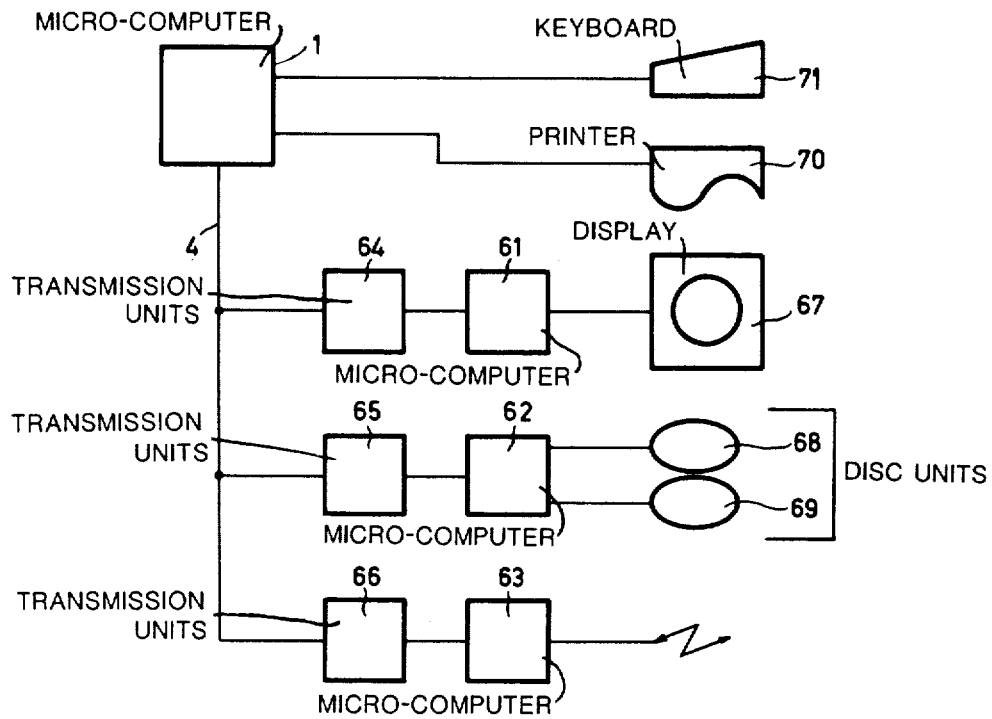
FIG. 4 shows a block diagram of a second embodiment.

FIG. 4 is a block diagram of a text processing system. In FIG. 4, reference numeral 1 again denotes a microcomputer which operates as a master and whose bus 4 acts as a common bus. Three further microcomputers 61, 62 and 63 act as slaves, a transmission unit, 64, 65 and 66 respectively, being provided between the common bus 4 and each of these slaves. The construction of each of these transmission units is the same as that of each of the transmission units 23 and 24 of the data processing system shown in FIG. 1, so that each unit again comprises a buffer memory, a switching device and two input/output interfaces. Each slave has its own function, i.e. the slave 61 provides control of a display device 67, the slave 62 provides control of two disc memories 68 and 69, and the slave 63 serves for the transmission of data, for example via telephone devices. The master 1 not only controls the system and the transmission of data, but also controls a printer 70. The master 1 also has connected to it a data input device 71 which comprises a keyboard via which instructions are fed to the system and the data (in this case texts etc.) are input. A system of this kind enables composition, editing, intermediate storage and ultimately printing or transfer of texts to a further text processing system to be carried out. As a result of the way in which the individual microcomputers cooperate, very complex tasks can thus be performed.

The transmission and processing of the data or texts is realized in the same manner as in the system shown in FIG. 1. For example, if given data are to be fed, under the command of the input device 71, from the disc memory 68 to the display device 67 in a given form, the master 1 instructs the buffer memory of the transmission unit 65 to be loaded with the corresponding data from the slave 62; this is confirmed to the master, which then switches the address field constituted by the buffer memory of the transmission unit 65 into its own address space and checks whether the slave 61 is ready for taking up data. As soon as this is the case, the address field constituted by the buffer memory of the transmission unit 64 is switched into the address space of the master 1, after which the transmission of data from one buffer memory to the other takes place; this may involve intermediate storage in the master. Subsequently, the address field constituted by the buffer memory of the transmission unit 64 is again switched into the address space of the slave 61 and slave 61 is informed of the availability of the data, after which it carries out the further operations required, so that ultimately the required data are displayed on the display device in the desired form. The transmission of the corresponding status signals between the master and the slaves and also the control of the relevant switching devices for the buffer memories again take place via the input/output interfaces of the transmission units 64 and 65. Cooperation, for example, between a disc memory and the printer 70 is realized in an analogous manner, the master itself, controlling the printer in this case. The execution of other tasks in the text processing system is carried out in a similar manner.

What is claimed is:

1. A data processing system comprising:
   a master computer having a master processing element with a master address space as defined by a first plurality of parallel address bits;
   a master memory having a second plurality of selectively addressable memory locations;
   said master processing element and said master memory being both connected to a master computer bus for accommodating data transfer and address transfer of said first plurality of parallel address bits defining a respective address within said master address space;
   at least two slave computers each having a slave processing element, having a slave address space and a slave memory connected to a slave computer bus;
   each slave computer furthermore having an attachment module (23, 24);
   each attachment module having a first control interface element for interfacing to the master computer and a second control interface element interconnected with said first control interface element for interfacing to the associated slave computer;
   said first control interface element having means for intercommunicating selectively to the master computer a first status signal indicating a data available status, a second status signal indicating a data receivable status, and a third status signal indicating an incorrectly operating status;
   each slave computer furthermore having a buffer memory comprising a third plurality of memory locations together constituting a buffer address field, each buffer memory having a switching device with a first and a second state, wherein the first state is operative for connecting the associated buffer address field to the master computer bus and the second state is operative for connecting the associated buffer address field to a slave computer bus;
   wherein said master address space comprises the addresses of said third plurality of memory locations uniquely and differing from the addresses of said second plurality of memory locations;
   wherein the slave address spaces each comprise the addresses of the memory locations within the associated buffer address field uniquely and differing from the address of memory locations within the associated slave memory; and
   wherein said master computer is provided with first control means for communicating data with a single slave computer while relinquishing control of any other slave computer to realize an autonomous operation.

2. A data processing system as claimed in claim 1 wherein the number of slave computers equals at least three;
   wherein said master address space compises the addresses of said third plurality of memory locations associated to any buffer memory uniquely and differing from the addresses of said second plurality of memory locations and differing from the addresses of said third plurality of memory locations associated with any other buffer memory; and
   wherein said master computer is provided with second control means for communicating data from a first slave computer to a second slave computer as a direct read and write operation between two respective address locations while relinquishing control of any other slave computer to realize an autonomous operation.

* * * * *